Sept. 20, 1971   R. J. DORN   3,606,386
FIFTH WHEEL ELEVATABLE MOUNTING FOR TERMINAL TRACTOR
Filed May 11, 1969
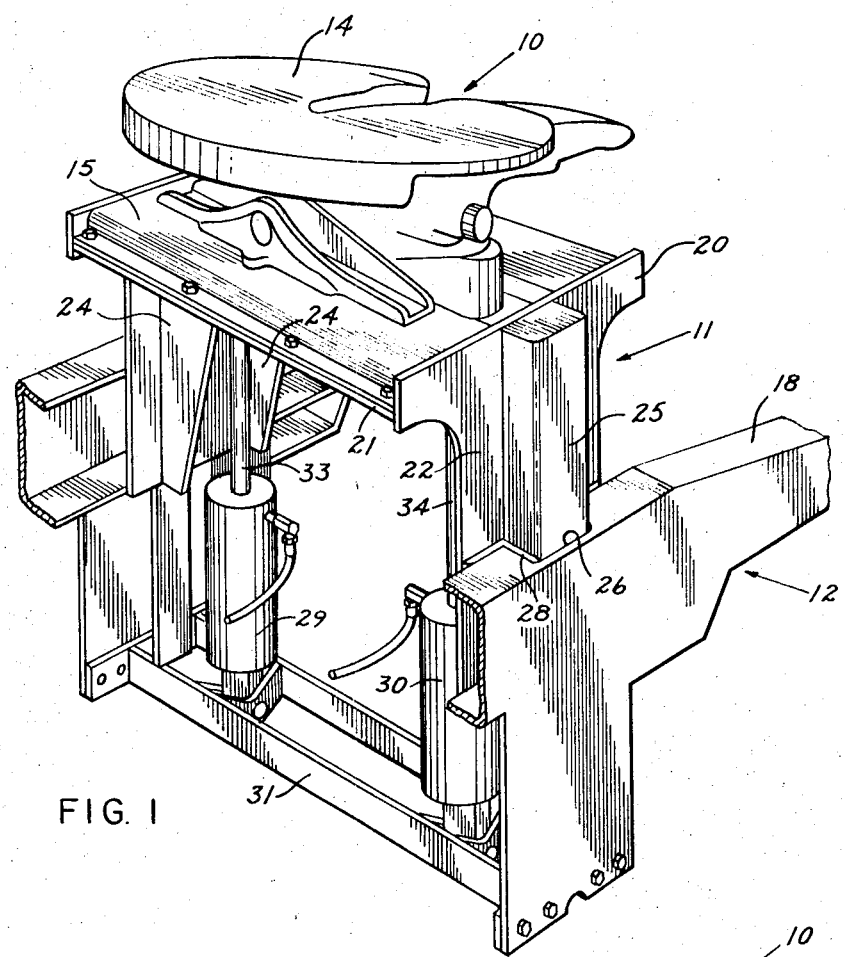
FIG. 1
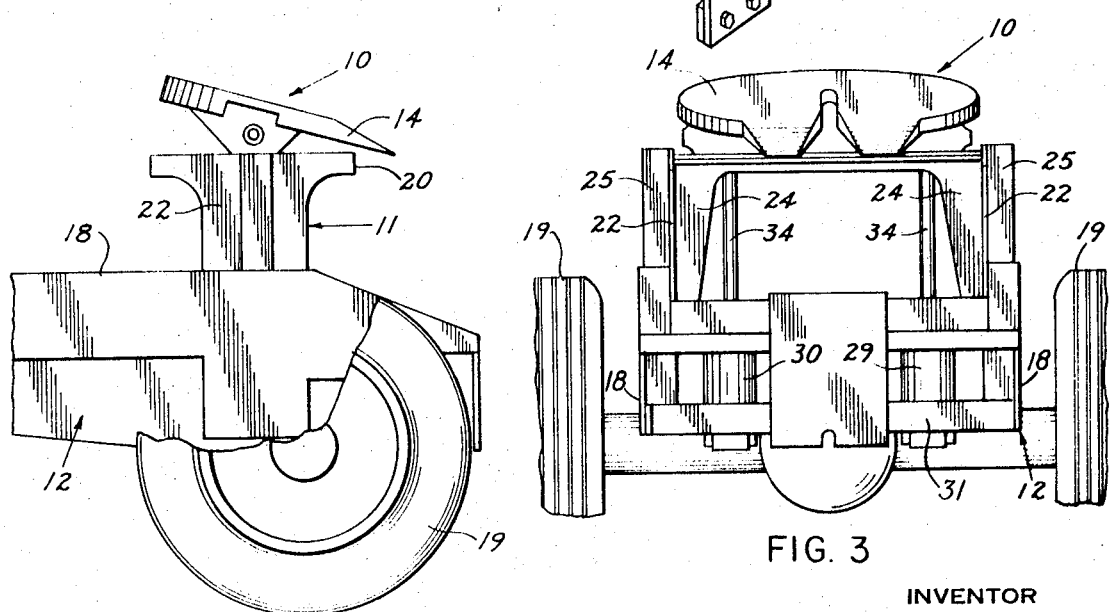
FIG. 2
FIG. 3
INVENTOR
RUSSELL JOHN DORN
BY
Drake + Crandell
ATTORNEYS

United States Patent Office 3,606,386
Patented Sept. 20, 1971

3,606,386
FIFTH WHEEL ELEVATABLE MOUNTING
FOR TERMINAL TRACTOR
Russell John Dorn, Aurora, Colo., assignor to
CEG Corporation
Filed May 11, 1970, Ser. No. 36,043
Int. Cl. B62d 53/08
U.S. Cl. 280—425
2 Claims

ABSTRACT OF THE DISCLOSURE

A terminal tractor for shuttling and spotting semi-trailers in a terminal or dock area is provided with an adjustably mounted fifth wheel structure. The fifth wheel is mounted on a carriage platform which is guided for vertical movement upon the tractor chassis by spaced rail engaging channels. Hydraulic lifting hoists are provided for raising and lowering the carriage platform and fifth wheel vertically to raise or lower the semi-trailer.

BACKGROUND OF THE INVENTION

This invention relates to a tractor for handling large semi-trailers, and more particularly to an improved fifth wheel elevating device for use on trailer tractors of the type adapted for handling, shuttling and spotting semi-trailers during loading and unloading operations at a terminal or loading dock.

In the handling of large semi-trailers at a terminal, loading dock, depot, yard, railroad piggyback yard, or the like, use of a conventional over-the-road tractor is impractical because of size, space and maneuverability limitations. There has been developed and disclosed in the prior art special yard or terminal tractors. See for example U.S. Pat. No. 2,515,575, issued July 18, 1950, to G. K. Van Langen for "Trailer Handling Device"; U.S. Pat. No. 2,967,721, issued Jan. 10, 1961, to R. J. Helton, for "Fifth Wheel Elevating Device"; U.S. Pat. No. 3,139,289, issued June 30, 1964, to M. Richler, for "Tractor With Elevatable Fifth-Wheel"; U.S. Pat. No. 3,352,374, issued Nov. 14, 1967, to F. H. Vivian, for "Trailer Tractor." The terminal tractor devices disclosed in the foregoing patents generally include an elevatable fifth wheel which enables the tractor operator to engage and lift large heavy semi-trailer off of its front supports for shuttling the trailer and spotting it at a new location without the bother and inconvenience of retracting the front supports on the semi-trailer during each shifting movement. The structure of the lifting mechanism thus becomes extremely important for the economical and efficient operation of the terminal tractor.

OBJECTS OF THE INVENTION

It is the principal object of the present invention to provide an improved fifth wheel lifting mechanism for a terminal tractor. More specifically, it is an object of this invention to provide a fifth wheel lifting mechanism which is simple, economical to build and maintain, rugged, has a minimum of moving parts, and is fast and efficient in operation. A more specific object is to provide a fifth wheel elevating mechanism which maintains a constant horizontal position with respect to the chassis of the terminal tractor in order to facilitate shuttling and accurate spotting of semi-trailers at loading docks, on piggyback railway cars, and in other locations requiring careful and accurate positioning of the relatively large and heavy semi-trailer.

SUMMARY OF THE INVENTION

The invention described herein involves a terminal tractor for use in shifting large, heavy semi-trailers at loading areas, docks, piggyback railway car loading stations, and like yard operations, as well as for short hauls in intra-city operations, particularly during loading and unloading procedures. The terminal tractor is a dirigible automotive vehicle having a wheeled chassis with an operator's cab thereon. At the rear of the chassis, the tractor carries a fifth wheel assembly for engagement with a semi-trailer. The fifth wheel assembly is mounted on an elevating mechanism which includes a carriage mounted on the vehicle chassis for vertical elevating and lowering movement. The fifth wheel mounting carriage is provided with a platform for mounting the fifth wheel assembly and includes spaced support legs which carry guide rails which are in turn slidingly received in corresponding guide channels on the chassis frame. Power means acting between the frame and the carriage raise and lower the platform and the fifth wheel structure carried thereby with respect to the vehicle chassis. The tractor includes a power source, such as a source of hydraulic pressure fluid for carrying out its steering and motive operations. This power source may be conveniently utilized to drive the power means for raising and lowering the fifth wheel structure. The fifth wheel is raised and lowered in a vertical plane and is guided in its movements by the cooperation between the frame channels and the carriage rails.

DESCRIPTION OF THE DRAWING

FIG. 1 is an isometric view of a fifth wheel mounting structure embodying the present invention and showing a portion of the vehicle chassis partially broken away and the vehicle drive train elements removed for clarity in illustrating the invention.

FIG. 2 is an elevation view of the rear end portion of the vehicle chassis and showing a fifth wheel mounting and elevating structure embodying the present invention.

FIG. 3 is an end elevation view of the structure shown in FIG. 2.

DESCRIPTION OF THE PREFERRED EMBODIMENT

The embodiment of the present invention shown in the drawings comprises a fifth wheel mounting assembly 10, supported by a fifth wheel elevating structure 11 embodying the present invention, on the chassis 12 of a dirigible automotive vehicle. The fifth wheel assembly 10 includes a fifth wheel 14 of the conventional type adapted to engage with the hitch mechanism of a semi-trailer (not shown) or the like. The fifth wheel assembly 10 of the type herein shown is a conventional structure ordinarily commercially available in assembled form. The assembly includes the mounting plate 15 by which the assembly may be mounted on a vehicle.

The vehicle chassis 12 includes a frame 18 supported by appropriate axle and bearing arrangements on wheels 19 in a conventional manner. The frame 18 as shown in the drawings is in the form of parallel channel shaped side rails.

The present elevating structure for the fifth wheel assembly mounts directly on the vehicle frame between the frame channels 18. The elevating assembly 11 comprises a carriage 20 having a table 21 for mounting the mounting plate 15 of the fifth wheel assembly 10. The table 21 is supported at its opposite ends by mounting plates or legs 22. To rigidify the structure brackets or braces 24 are positioned in the included angle between the table 21 and plates 22.

The carriage is mounted on the vehicle frame for vertical reciprocating movement. To this end, the side plates 22 are provided with vertically extending elongated guide rails 25 which are received within channels 26 defined in the vehicle frame members 18. Bushings 28 are mounted within the channels to provide bearing surfaces for slidingly receiving the carriage rails 25.

The fifth wheel carriage 20 is raised and lowered by motor power units such as piston and cylinder type hydraulic cylinders 29 and 30. The cylinders are mounted on a support member 31 extending between the frame channels 18 below the guide rail channels 26. The free ends of the pistons 33, 34 of each power unit 29, 30 are secured to the underside of the carriage table by appropriate connecting means (not shown). The lifting motors 29, 30 are appropriately driven from the power source of the vehicle. When hydraulic cylinders are utilized, it is contemplated that the vehicle system will be hydraulic or will include the necessary power source such as a hydraulic pump and motor unit.

In operation, the driver of the vehicle lowers the carriage 11 and fifth wheel assembly 10, and backs the tractor underneath the trailer to be moved. The fifth wheel assembly 10 is thereby engaged with the trailer, and then the carriage assembly 11 is raised to lift the front end of the trailer so that the trailer support wheels clear the ground. The trailer can then be moved to another location without the necessity of a separate operation to retract the support wheels. The trailer may be spotted at a new location and the fifth wheel assembly lowered to disengage the tractor from the trailer.

While a certain illustrative embodiment of the present invention has been shown in the drawing and described above in considerable detail, it should be understood that there is no intention to limit the invention through the specific form disclosed. On the contrary, the intention is to cover all modifications, alternative constructions, equivalents and uses falling within the spirit and scope of the invention as expressed in the apparent claims.

I claim as my invention:

1. In a dirigible automotive terminal tractor vehicle for shuttling and spotting semi-trailers and the like, the tractor including a chassis frame mounting a fifth wheel assembly and a power source, the improvement comprising a fifth-wheel elevating structure supporting the fifth wheel assembly and comprising a carriage having a horizontal platform for supporting the fifth wheel assembly and a depending support plate on each end thereof, a vertical guide rail on each support plate, means defining opposed vertical guide channels on the chassis frame for slidably receiving said carriage guide rails, and power means mounted on the chassis frame and actuated by the vehicle power source, said power means operatively engaging said carriage for raising and lowering the same thereby to raise and lower trailers engaged by the fifth wheel assembly carried by said carriage.

2. A tractor vehicle as defined in claim 1 wherein said vehicle power source is a hydraulic pump and said power means comprise a pair of hydraulic piston and cylinder motors, each motor having the cylinder thereof mounted on said chassis frame adjacent one of said carriage support plates and the piston thereof operatively engaged with the underside of the carriage platform.

References Cited

UNITED STATES PATENTS

| | | | |
|---|---|---|---|
| 1,523,249 | 1/1925 | Blum | 298—21 |
| 1,568,168 | 1/1926 | Land | 280—425X |
| 1,862,574 | 6/1932 | Kuhlman | 280—425 |
| 2,336,831 | 12/1943 | Ashworth | 187—9 |
| 2,637,453 | 5/1953 | Cleveland | 214—15 |
| 2,756,073 | 7/1956 | Bridge | 280—425 |
| 2,773,614 | 12/1956 | Edwards et al. | 280—425X |
| 2,783,899 | 3/1957 | Gutridge | 280—425X |
| 3,139,289 | 6/1964 | Richler | 280—425 |

LEO FRIAGLIA, Primary Examiner

U.S. Cl. X.R.

254—2.2 (R); 298—22AE